(12) United States Patent
Abraham et al.

(10) Patent No.: US 6,469,690 B1
(45) Date of Patent: *Oct. 22, 2002

(54) DATA SHARING FOR MULTI-CPU MOUSE/KEYBOARD SWITCHER

(75) Inventors: David William Abraham, Croton; Robert Stephen Olyha, Jr., LaGrange, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/553,996

(22) Filed: Apr. 20, 2000

(51) Int. Cl.$^7$ ................................................. G09G 5/00
(52) U.S. Cl. ...................... 345/156; 345/157; 345/163; 345/168
(58) Field of Search ................................. 345/718, 717, 345/748, 749, 753, 761, 740; 709/204–205, 212–219

(56) References Cited

U.S. PATENT DOCUMENTS

| | | | |
|---|---|---|---|
| 6,069,615 A | * 5/2000 | Abraham et al. | 345/1.1 |
| 6,091,412 A | * 7/2000 | Simonoff et al. | 345/335 |
| 6,104,392 A | * 8/2000 | Shaw et al. | 345/738 |
| 6,295,535 B1 | * 9/2001 | Radcliffe et al. | 707/10 |
| 6,314,430 B1 | * 11/2001 | Chang | 707/10 |

* cited by examiner

Primary Examiner—Bipin Shalwala
Assistant Examiner—Ralph L. Taylor
(74) Attorney, Agent, or Firm—Scully, Scott, Murphy & Presser; Stephen C. Kaufman, Esq.

(57) ABSTRACT

A work station comprising a plurality of computers, and a method of operating that work station. Each of the computers at the work station includes a keyboard port and a pointing device port; and the work station further comprises a single external user keyboard, a single external pointing device, and a fanout switching unit connected to and for interfacing between the computers and the external keyboard and pointing device. In use, at any given time, the external keyboard and pointing device control a selected one of the computers, via the fanout switching unit. The fanout switching unit, acting in response to a predefined switching command from at least one of the external keyboard and pointing device, changes, or switches, the computer that is controlled by the external keyboard and pointing device. In particular, the computer that is controlled changes from a first of the computers to a second of the computers. The work station further comprises means, also acting in response to the predefined switching command, to copy data from a predetermined database of the first computer and to write the copied data in a predetermined database of the second computer. In this way, as a user, switches from working on one of the computers to working, on another of the computers, data that the user is using can be automatically copied from the former, or exit, computer to the latter, or enter, computer, providing a seamless switching between the computers.

12 Claims, 7 Drawing Sheets

Providing a single external user keyboard, a single external pointing device, and a fanout switching unit for interfacing between the computers and said external user keyboard and pointing device.

↓

Directly connecting the fanout switching unit to each of the keyboard ports and to each of the pointing device ports, and connecting the external user keyboard and the external pointing device to the fanout switching unit.

↓

Using the external user keyboard and the external pointing device to control a selected one of the computers, via the fanout switching unit.

↓

Switching the selected one of the computers from a first of the computers to a second of the computers in response to a predefined switching command from at least one of the external user keyboard and pointing device.

↓

Also in response to the predefined switching command, copying data from a predetermined database of the first computer and writing the copied data in a predetermined database of the second computer.

FIG. 2

DATA SHARING FOR MULTI-CPU MOUSE/KEYBOARD SWITCHER

BACKGROUND OF THE INVENTION

The present invention generally relates to an assembly and procedure for operating multiple computers and associated display screens by way of a single pointing device and keyboard combination.

A common workplace situation features an employment of multiple computers and associated displays in a given work area. One problem with this arrangement is that there may be an accompanying clutter of duplicate keyboards and pointing devices (e.g., track balls, mice, etc.) that may limit an available workspace, as well as slow a transition for a user between the various operating sessions. For example, moving one's hands and body to allow typing and interaction from one machine to another can take time and can often disadvantageously require physically repositioning a keyboard and pointing device.

Many aspects of this problem are effectively addressed and solved by an assembly disclosed and described in copending U.S. patent application Ser. No. 08/914,373, the disclosure of which is herein incorporated by reference. The solution disclosed in this copending application is based on the recognition that, since the functions of the keyboard and pointing device are nearly identical for all commercially available machines, a reduction of clutter and an increase in ergonomic functions can be obtained by using only one of each for all of the computers to be addressed.

The solution discussed in U.S. patent application Ser. No. 08/914,373 is an important advancement. This solution, however, does not address the sharing of information between the machines in other than a manual fashion.

SUMMARY OF THE INVENTION

An object of this invention is to improve procedures for sharing information between computers at a workstation.

Another object of the present invention is to make connected computers, which are controlled by a single common keyboard and pointing device, appear to be seamlessly connected.

These and other objectives are attained with a work station comprising a plurality of computers, and a method of operating that work station. Each of the computers at the work station includes a keyboard port and a pointing device port; and the work station further comprises a single external user keyboard, a single external pointing device, and a fanout switching unit connected to and for interfacing between the computers and the external keyboard and pointing device.

In use, at any given time, the external keyboard and pointing device control a selected one of the computers, via the fanout switching unit. The fanout switching unit, acting in response to a predefined switching command from at least one of the external keyboard and pointing device, changes, or switches, the computer that is controlled by the external keyboard and pointing device. In particular, the computer that is controlled changes from a first of the computers to a second of the computers. The work station further comprises means, also acting in response to the predefined switching command, to copy data from a predetermined database of the first computer and to write the copied data in a predetermined database of the second computer. In this way, as a user switches from working on one of the computers to working on another of the computers, data that the user is using can be automatically copied from the former, or exit, computer to the latter, or enter, computer, providing a seamless switching between the computers.

This data copying can be implemented either over the keyboard/mouse link or via a local area network. With one embodiment, for example, a mouse driver or equivalent may be used to allow the switching unit to interact with the databases. In this case, the switching unit communicates directly with the two CPU's and performs the copy function at the switching event. As an alternative, software may be provided on each of the connected computers that allows the computers to perform a best-case analysis as to which path would be best implemented—that is, copy either over the local area network or through the switching unit. As another alternative, OLE data synchronization between applications is used to copy the data to provide a seamless, single computer emulation. This latter arrangement allows duplication on both machines and the ability to scroll applications between computers.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 is a flow chart outlining the operation of the assembly of FIG. 1.

DETAILED DESCRIPTION OF THE PREFERRED EMBODIMENTS

Figure 1:
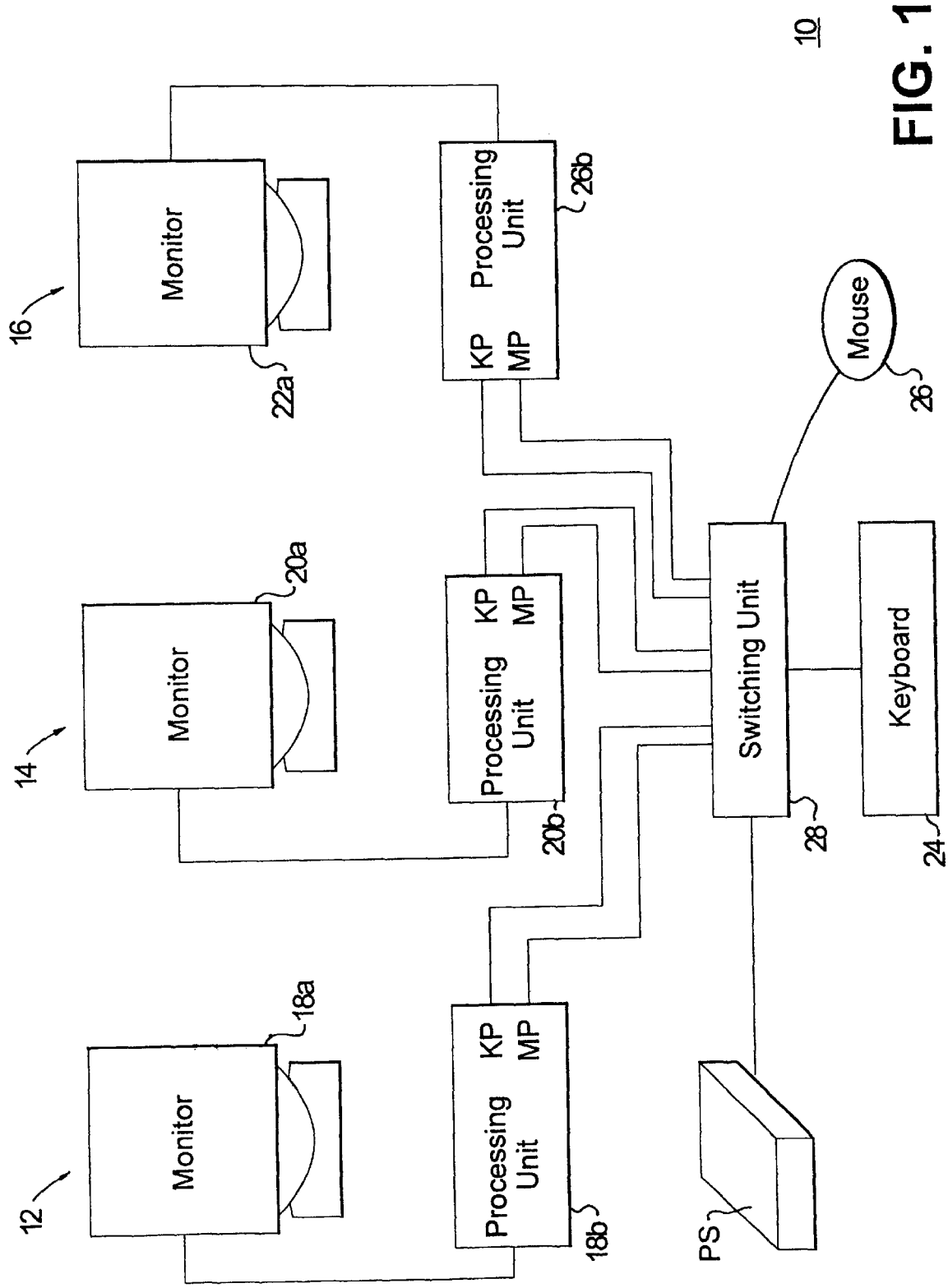
FIG. 1 shows a preferred assembly and arrangement of the present invention.

FIGS. 1 and 2 show work station 10 and FIG. 2 illustrates a preferred method of operating the workstation. Work station 10 comprises a plurality of computers 12, 14 and 16; and each computer 12, 14, 16 includes a monitor 18a, 20a, 22a, and a central processing unit 18b, 20b, 22b, and each central processing unit, in turn, includes a keyboard port KP and a mouse port MP. The work station, or assembly, 10 also includes a single external user keyboard 24 and mouse 26. A fanout switching unit 28 (preferably comprising a microprocessor-digital signal processor) interfaces and electronically connects, on one side, each of the plurality of computer keyboard ports and mouse ports, and, on a second side, the single external user keyboard 24 and mouse 26. A 5VDC power supply PS may be provided for the switching unit 28.

In operation, the fanout switching unit 28 can detect a desire of an operator to address a particular computer (i.e., computer 12, 14 or 16), and automatically achieve a proper switching to achieve that goal. This desire can be expressed in a number of ways, including mouse position, keyboard strokes, or other inputs such as an output from peripherals including eye-tracking hardware. Also, this switching event is used by the switching unit 28 to initiate a copy of the contents of a predetermined database or databases from the "exit" computer to the "enter" computer. This technique can be implemented either over the keyboard/mouse link or via a local area network. With one embodiment, for example, a mouse driver or equivalent may be used to allow the switching unit to interact with the databases. In this case, the switching unit 28 communicates directly with the two CPU's and performs the copy function at the switching event. As an alternative, software may be provided on each of the connected computers that allows the computers to perform a best-case analysis as to which path would be best implemented—that is, copy either over the local area network or through the switching unit. As another alternative, OLE data synchronization between applications is used to copy the data to provide a seamless, single computer emulation. This latter arrangement allows duplication on both machines and the ability to scroll applications between computers.

In the practice of this invention, data may be copied from any suitable database or databases. For instance, it is often very useful to copy data from a Clipboard.

Figure 3:
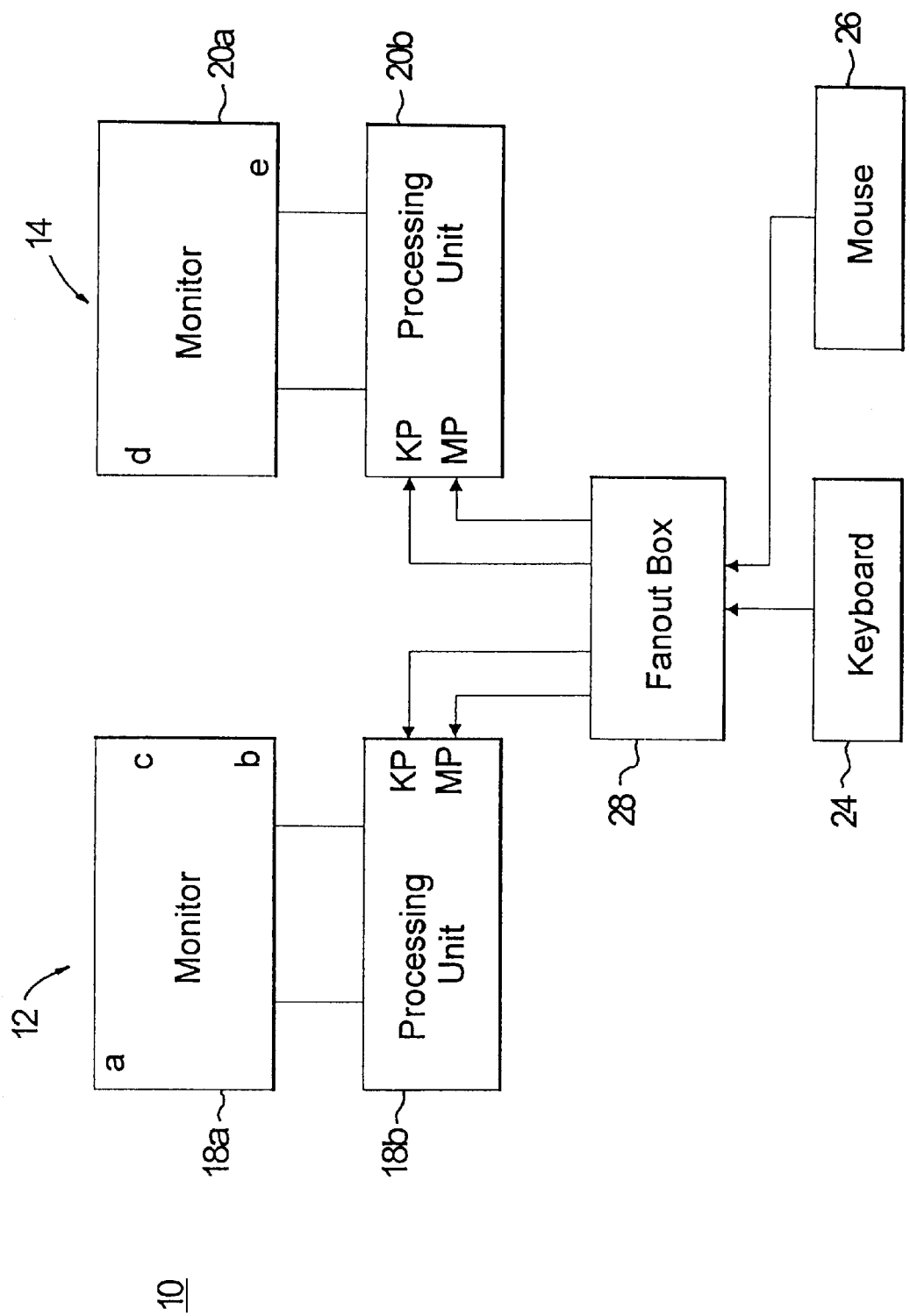
FIG. 3 shows an alternate assembly also embodying this invention.

As mentioned above, the switching between computers can be triggered in a number of ways. For example, a particularly attractive event to trigger switching between computers is to use the mouse 26 position. Since the mouse events can be routed through a microprocessor controlling the fanout switching unit 28 (discussed in detail, below) the mouse position can be calculated continuously once an initial starting-point is defined. As a default, at power-up the mouse position can be assumed to initialize at an extreme position on a computer display. For example, as shown in FIG. 3, we disclose a two computer/monitor arrangement. Monitor 18a (computer 12) is on the left, and monitor 20a (computer 14) is on the right. At startup, each computer can place a mouse cursor at some unknown (to the controller unit) location. By default (determined at setup by downloading instructions over the mouse or keyboard cable), the controller starts operation connected to computer 12. Mouse and keyboard commands are transmitted in the usual fashion to the microprocessor and from there to computer 12. The switch between computers 12 and 14 is achieved the first time by calculating when the mouse has moved at least one full screen width to the right, from it's initial unknown starting location. Subsequently, after this first switching event, the controller can calculate mouse position accurately, so that whenever the mouse hits a buffer zone on the right side of the screen (for monitor 18a) or left side of the screen (for monitor 20a) control may be transferred to the neighbor computer.

An alternative scheme, which allows for more precise determination of the monitor type, as well as allowing for a more flexible physical position of the workstations, can be achieved as follows. As shown in FIG. 3, the mouse is positioned at 'a' on monitor 18a. This position is the upper left corner of the CRT. The mouse 26 is then clicked once. Next, the mouse 26 is moved to position 'b', the lower right corner. Finally, the mouse 26 is positioned at 'c', which is the edge at which control is to be passed to monitor 20a.

At this point, the fanout switching unit 28 which is detecting the mouse events and monitoring mouse position, has both the pixel size of the screen as well as a desired 'hot zone' describing where the mouse and keyboard are to switch between computers. The fanout switching unit 28 then switches control to the second computer 14, and a similar procedure is followed to define screen dimension and the hot zone for switching to another computer. This procedure may be followed until all screens have been defined.

At this point (signaled by some means such as a keyboard stroke, a double mouse click, a right mouse click or some other similar event), control may be given to the final computer and the fanout switching unit 28 is placed in the standard controlling mode. When the mouse 26 approaches a hot zone, the fanout switching unit 28 determines appropriate switching and gives control to the proper neighbor computer.

This scheme can be extended to multiple computers, and is practically limited only in microprocessor power (to provide communications to several machines at once). Once more machines are connected to the fanout switching unit 28 than can be polled successfully with a single controller, a new fanout design can be implemented, for example, wherein several digital signal processors (DSP) are used and communicate with the mouse/keyboard switching DSP.

Alternatively to using the edges of the screens, one can place the mouse cursor on a GUI-drawn feature on the screen, coupled with a mouse click to transfer control. This action has the characteristic of a 'mouse teleporter', causing instant destruction of the cursor and recreation at a new location on another machine. This implementation requires software to be running on each computer controlled by the keyboard/mouse fanout.

Figure 4A:
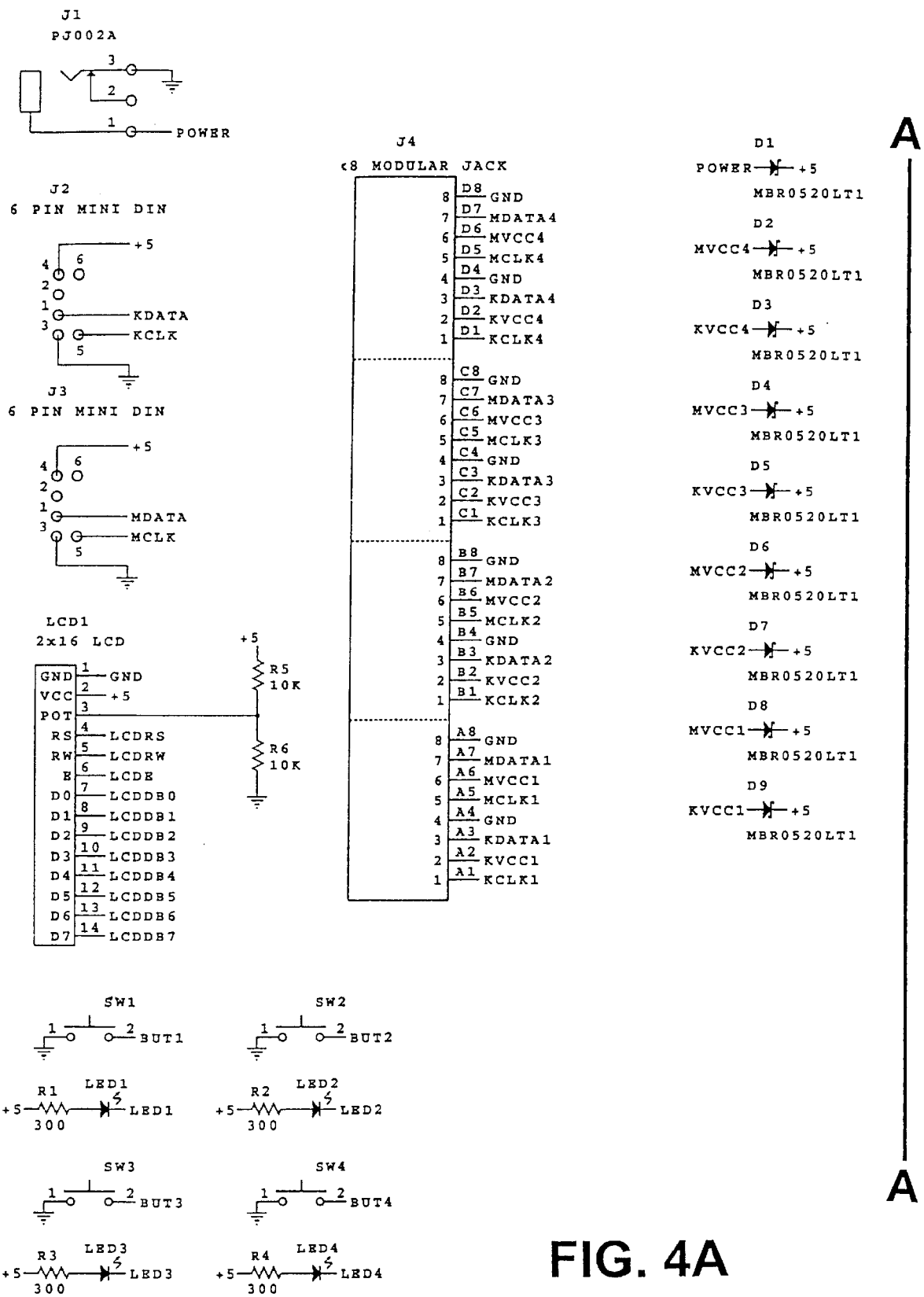
FIG. 4 shows a preferred realization of a fanout switching unit employed in the assemblies of FIGS. 1 and 3.
Figure 4B:
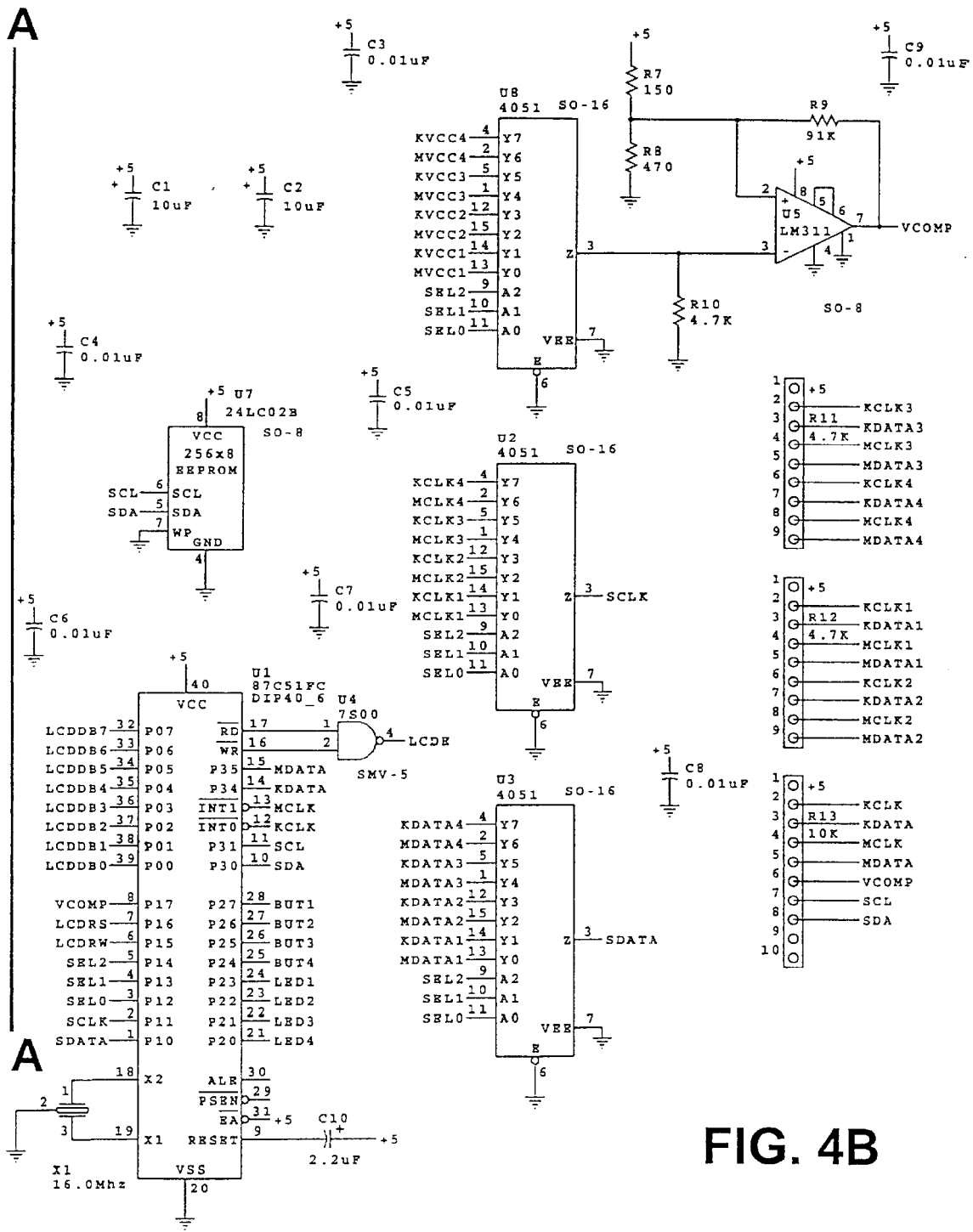
Figure 5:
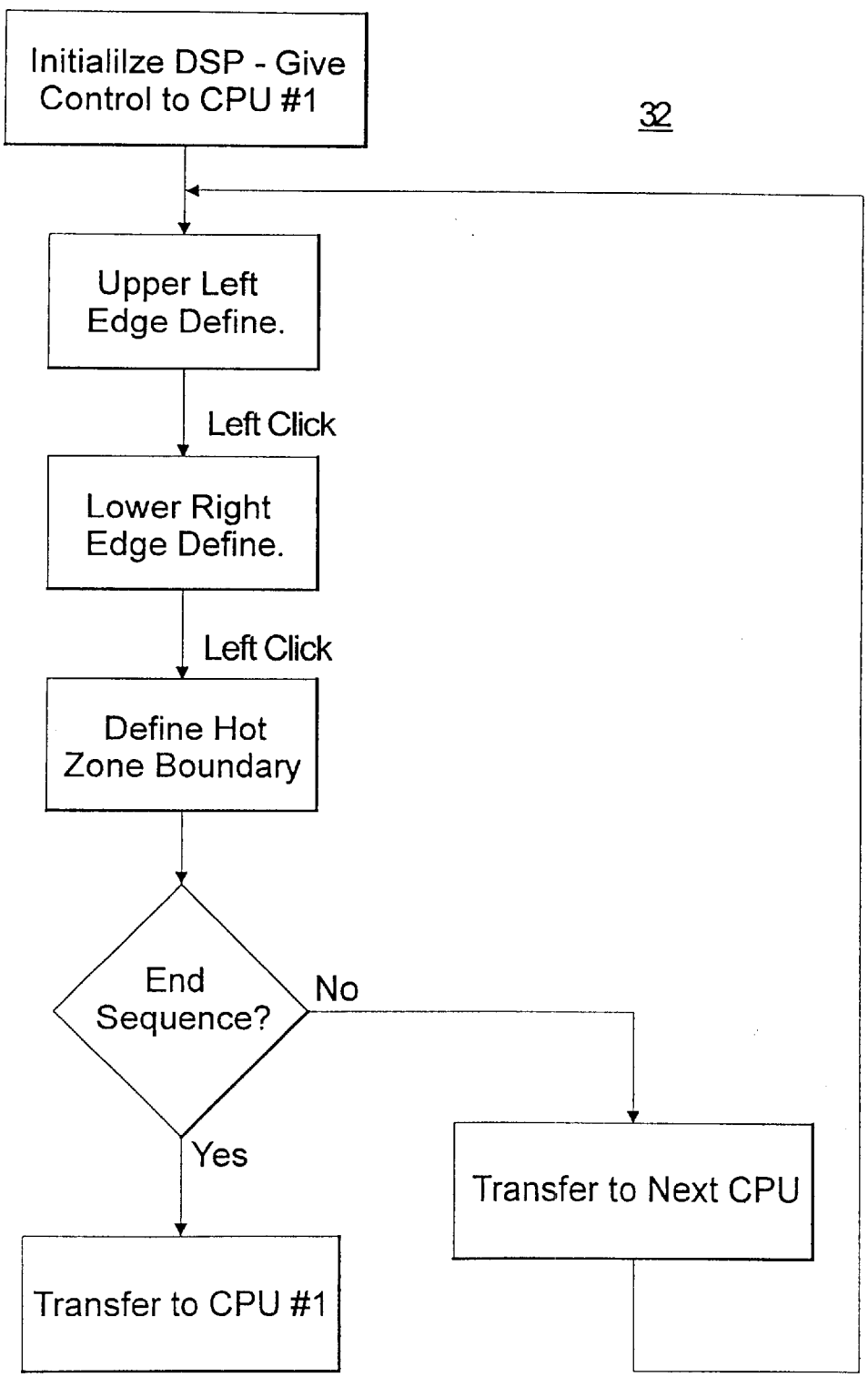
FIG. 5 provides a flowchart for operation of the FIG. 4 fanout switching unit.

Attention is now directed to FIGS. 4 and 5, which show respectively an electronic schematic of a microcontroller 30 which is a preferred realization of the fanout switching unit 28, and a flowchart 32 articulating preferred microcontroller 30 operating steps. In particular, the microcontroller 30 functions as a digital signal processor (DSP), preferably in accordance with the microcode steps specified in the FIG. 5 flowchart 32.

As described above, the microcontroller 30 is electronically connected, on a first side, to the keyboard ports and mouse ports of the plurality of computers, and, on a second side, to the single external user keyboard and mouse: these connections are also shown in FIG. 4.

Although there presently exists a wide variety of computer hardware devices, the mouse and keyboard on most systems are of the PS/2 standard. Thus, for systems which use PS/2 standards for I/O, the fanout switching unit 28 can be readily designed to properly interpret an incoming mouse signal. In addition to PS/2, RS-232 mice are occasionally still found, although are rare enough to not cause sufficient market impact. Another new standard soon to be adopted is the USB (Universal Serial Bus) system. Finally, there are a number of unique systems typically in place on higher end workstations. In all cases, a translation of mouse signals to the proper scheme can be accomplished using the DSP unit, providing the DSP is aware of which type of mouse/keyboard goes with a given CPU. This can be accomplished either in a trial and error basis, with the user cycling the DSP through various options by pressing a button on the fanout switching unit 28 until proper control is obtained, or by providing a direct input from one of the machines talking through the mouse to the DSP. This latter option requires a utility running on the host CPU, which would provide a setup menu and download function.

As an additional requirement, the controller allows each machine to boot without giving keyboard and mouse errors. The microprocessor preferably includes algorithms for determining the type and characteristics of each computer to which it can provide keyboard/mouse service.

Figure 6:
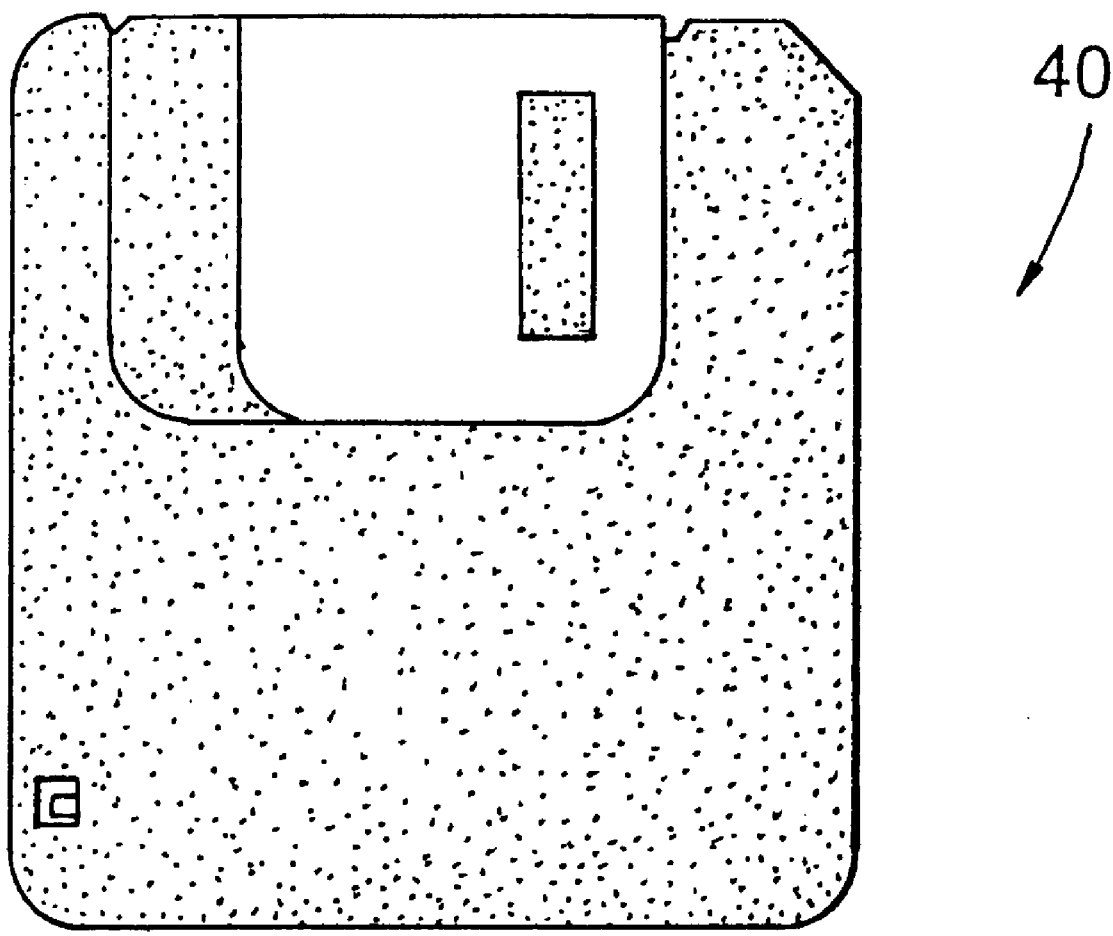
FIG. 6 illustrates a memory medium that can be used to hold a computer program for carrying out this invention.

FIG. 6 shows a memory medium 40 that may be used to hold a computer program for implementing the present invention, and this medium may be used in any suitable way with any appropriate computer to carry out the invention. Typically, memory media such as a floppy disk, or a CD ROM, or a Digital Video Disk will contain the program information for controlling the computer to enable the computer to perform its functions in accordance with the invention.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A work station comprising:
    a plurality of computers, each computer including (i) a keyboard port and,(ii) a pointing device port;
    a single external user keyboard;
    a single external pointing device;
    a fanout switching unit for interfacing between the computers and said external user keyboard and pointing device;
    first connecting means directly connecting the fanout switching unit to each of the keyboard ports and to each of the pointing device ports; and
    second connecting means connecting the external user keyboard and the external pointing device to the fanout switching unit; and
    wherein the external user keyboard and the external pointing device control a selected one of the computers, via the fanout switching unit; and the fanout switching unit, acting in response to a predefined switching command from at least one of the external user keyboard and pointing device,. switches the selected one of the computers from a first of the computers to a second of the computers; and
    the work station further comprises means, acting in response to the predefined switching command, to copy data from a predetermined database of the first computer and to write the copied data in a predetermined database of the second computer.

2. A work station according to claim 1, further comprising a local area network connecting together the plurality of computers, and wherein the copied data is transmitted over the local area network from the first computer to the second computer in response to the predefined switching command.

3. A work station according to claim 1, wherein the copied data is transmitted from the first computer, through the fanout unit, and to the second computer in response to the predefined switching command.

4. A work station according to claim 1, wherein the predetermined databases are Clipboards.

5. A method of operating a work station comprising a plurality of computers, each computer including (i) a keyboard port and (ii) a pointing device port, the method comprising the steps of:
    providing a single external user keyboard;
    providing a single external pointing device;
    providing a fanout switching unit for interfacing between the computers and said external user keyboard and pointing device;
    directly connecting the fanout switching unit to each of the keyboard ports and to each of the pointing device ports; and
    connecting the external user keyboard and the external pointing device to the fanout switching unit;
    using the external user keyboard and the external pointing device to control a selected one of the computers, via the fanout switching unit;
    switching the selected one of the computers from a first of the computers to a second of the computers in response to a predefined switching command from at least one of the external user keyboard and pointing device; and
    also in response to the predefined switching command, copying data from a predetermined database of the first computer and writing the copied data in a predetermined database of the second computer.

6. A method according to claim 5, further comprising the step of connecting together the plurality of computers over a local area network, and wherein the copying step includes the step of transmitting the copied data over the local area network from the first computer to the second computer in response to the predefined switching command.

7. A method according to claim 5, wherein the copying step includes the step of transmitting the copied data from the first computer, through the fanout unit, and to the second computer in response to the predefined switching command.

8. A method according to claim 5, wherein the predetermined databases are Clipboards.

9. A program storage device readable by machine, tangibly embodying a program of instructions executable by the machine to perform method steps for operating a work station, said work station comprising (i) a plurality of computers, each computer including a keyboard port and a pointing device port, (ii) a single external user keyboard, (iii) a single external pointing device, and (iv) a fanout switching unit for interfacing between the computers and said external user keyboard and pointing device, said method steps comprising:
    using the external user keyboard and the external pointing device to control a selected one of the computers, via the fanout switching unit;
    switching the selected one of the computers from a first of the computers to a second of the computers in response to a predefined switching command from at least one of the external user keyboard and pointing device; and
    also in response to the predefined switching command, copying data from a predetermined database of the first computer and writing the copied data in a predetermined database of the second computer.

10. A program storage device according to claim 9, wherein the plurality of computers are connected together over a local area network, and the copying step includes the step of transmitting the copied data over the local area network from the first computer to the second computer in response to the predefined switching command.

11. A program storage device according to claim 9, wherein the copying step includes the step of transmitting the copied data from the first computer, through the fanout unit, and to the second computer in response to the predefined switching command.

12. A program storage device according to claim 9, wherein the predetermined databases are Clipboards.

* * * * *